_(12)_ United States Patent
Sawada

(10) Patent No.: US 9,191,548 B2
(45) Date of Patent: Nov. 17, 2015

(54) IMAGE PROCESSING DEVICE DETERMINING WHETHER IMAGE IS BLANK IMAGE

(71) Applicant: Brother Kogyo Kabushiki Kaisha, Nagoya-shi, Aichi-ken (JP)

(72) Inventor: Kazuhide Sawada, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/193,082

(22) Filed: Feb. 28, 2014

(65) Prior Publication Data

US 2014/0240793 A1    Aug. 28, 2014

(51) Int. Cl.
*H04N 1/38* (2006.01)
*H04N 1/40* (2006.01)
*G06T 7/40* (2006.01)

(52) U.S. Cl.
CPC ............ *H04N 1/40062* (2013.01); *G06T 7/408* (2013.01); *G06T 2207/10008* (2013.01)

(58) Field of Classification Search
None
See application file for complete search history.

(56) References Cited

U.S. PATENT DOCUMENTS

| 6,118,895 | A |   | 9/2000 | Hirota et al. |
| 8,223,411 | B2 | * | 7/2012 | Akiyama et al. ............. 358/522 |
| 2008/0117308 | A1 | * | 5/2008 | Sa ............................. 348/223.1 |
| 2010/0182618 | A1 |   | 7/2010 | Akiyama et al. |

FOREIGN PATENT DOCUMENTS

| JP | H08-251402 A | 9/1996 |
| JP | 2001-143050 A | 5/2001 |
| JP | 2003-198777 A | 7/2003 |
| JP | 2008-022275 A | 1/2008 |
| JP | 2008-219810 A | 9/2008 |
| JP | 2010-191941 A | 9/2010 |
| JP | 2012-209908 A | 10/2012 |

* cited by examiner

*Primary Examiner* — Vincent Rudolph
*Assistant Examiner* — Michael Burleson
(74) *Attorney, Agent, or Firm* — Banner & Witcoff, Ltd.

(57) ABSTRACT

In an image processing device having an image processing unit, a first determination process determines whether each of the plurality of blocks is a single-color block, a non-single-color block, or a non-determinative block. Determination of the non-determinative block is made when neither a single block condition nor a non-single-block condition is met. A second determination process determines whether the non-determinative block is the single block or the non-single block based on a result of the first determination process with respect to a neighboring block neighboring the non-determinative block. The blank determination process determines whether the image is a blank image based on at least one of number of single color blocks determined in the first determination process or the second determination process and number of non-single-color blocks determined in the first determination process or the second determination process.

9 Claims, 9 Drawing Sheets

READ IMAGE G1
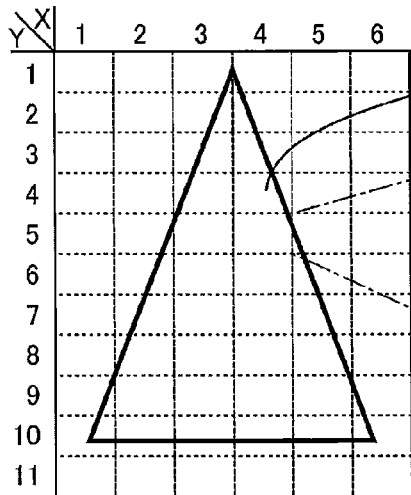
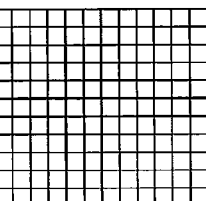
FIG. 7
■ NON-SINGLE COLOR BLOCK
▨ NON-DETERMINATIVE BLOCK
□ SINGLE COLOR BLOCK
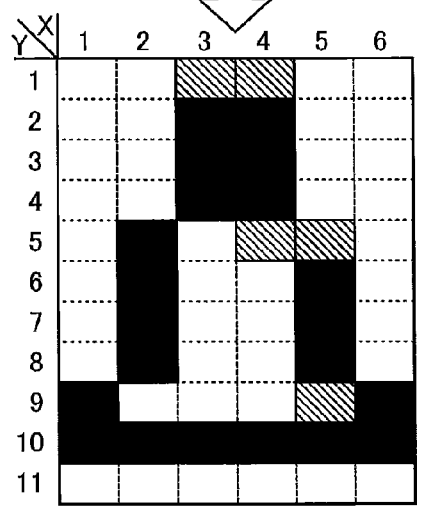
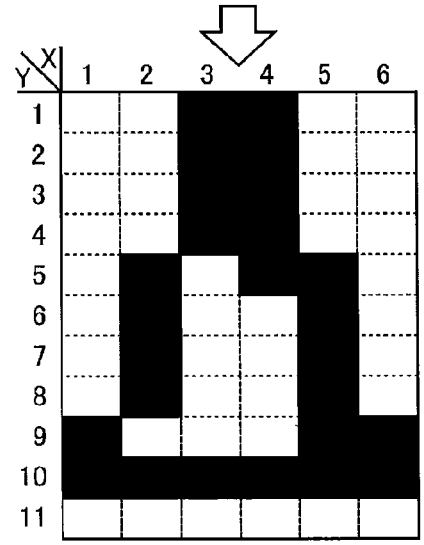

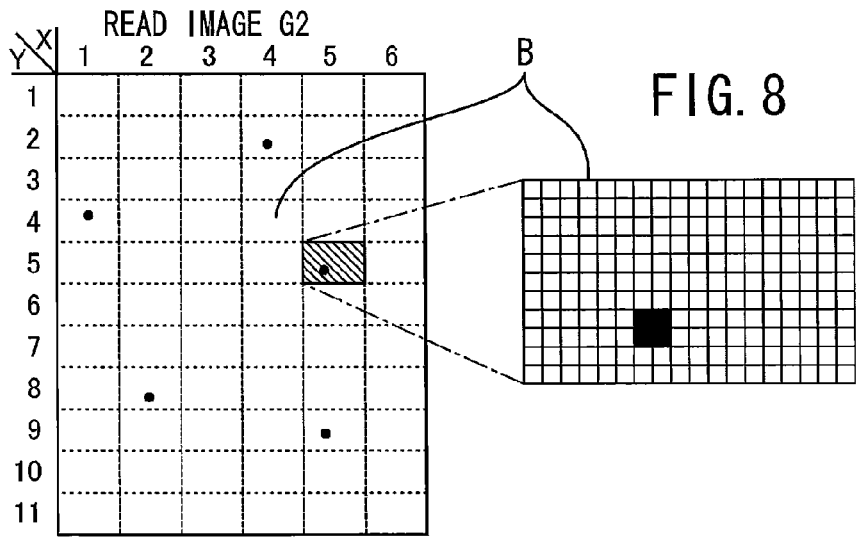
FIG. 8
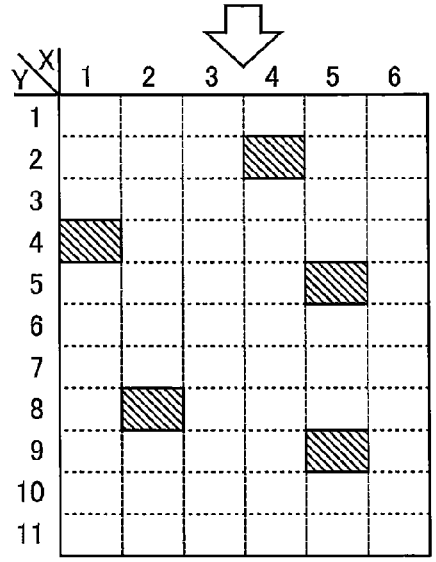
■ NON-SINGLE COLOR BLOCK
▨ NON-DETERMINATIVE BLOCK
☐ SINGLE COLOR BLOCK
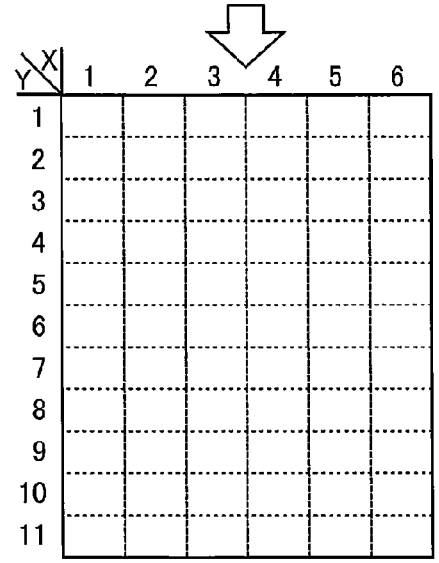

FIG. 9
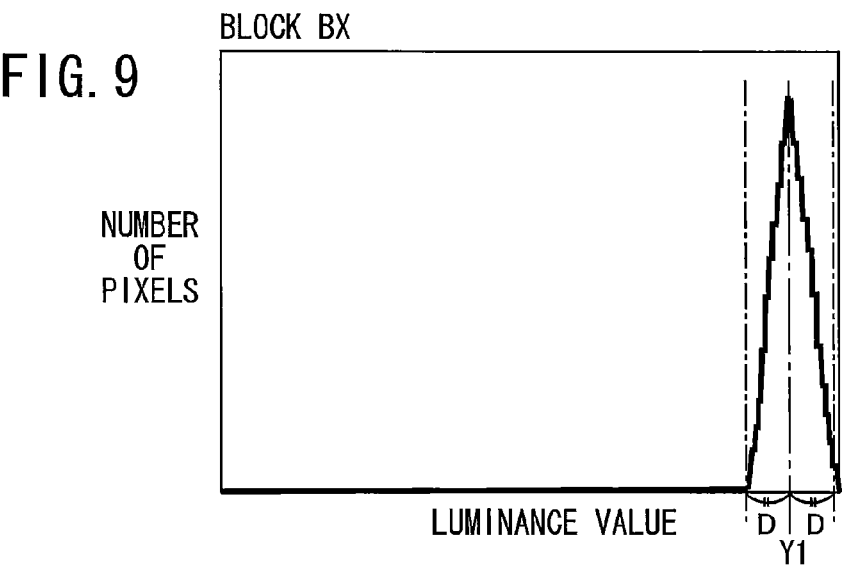
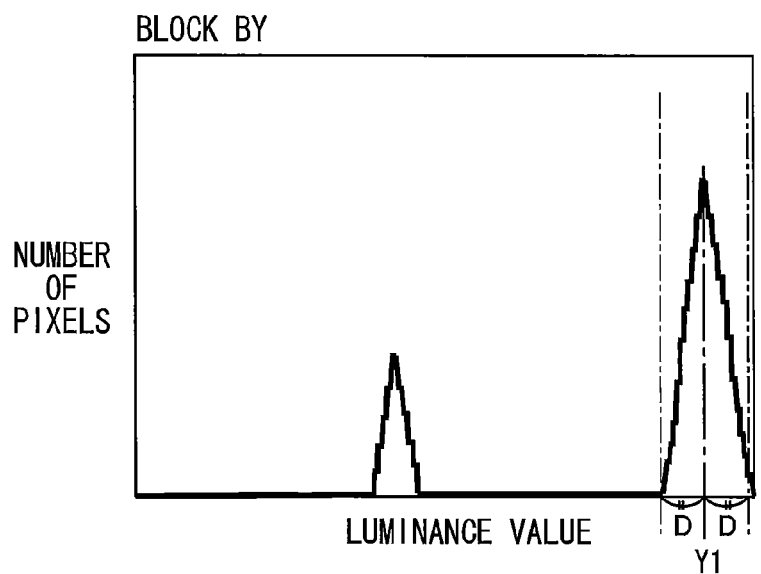
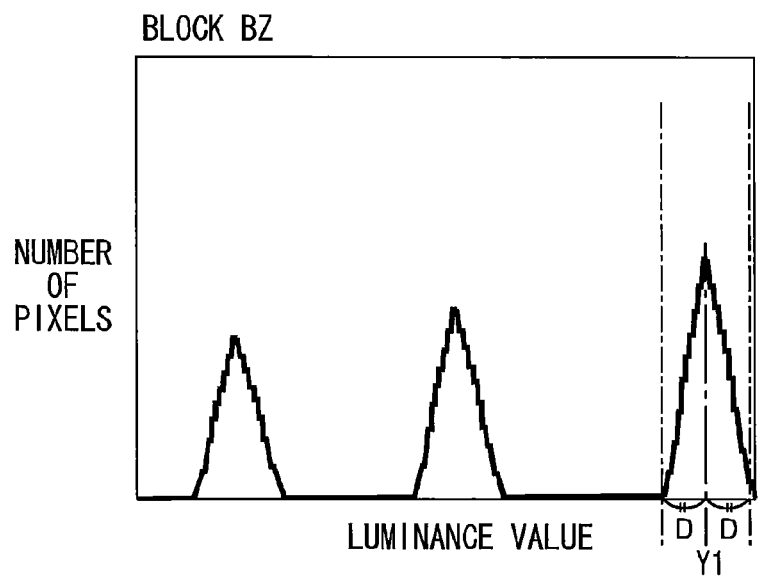

IMAGE PROCESSING DEVICE DETERMINING WHETHER IMAGE IS BLANK IMAGE

CROSS REFERENCE TO RELATED APPLICATION

This application claims priority from Japanese Patent Application No. 2013-039562 filed Feb. 28, 2013. The entire content of the priority application is incorporated herein by reference.

TECHNICAL FIELD

The present invention relates to a technique for determining whether an obtained image is a blank image or a non-blank image.

BACKGROUND

There is a conventional image processing device that determines whether an obtained image is a blank image, i.e. solid-color sheet, or a non-blank image. The image processing device includes a scanner unit and a control unit. The scanner unit reads a document sheet to obtain read image data. The control unit divides the read image from the obtained read data into blocks or a plurality of regions that are constant in size. The control unit determines whether each block is a blank block or a non-blank block. If the control unit judges even one of a plurality of blocks as a non-blank block, then the control unit determines that the read image is a non-blank.

SUMMARY

Noise images, such as minute dust, might exist on the obtained image. When blocks including the noise images are substantially blank blocks, the blocks can be judged as non-blank blocks. If more strict conditions for determining non-blank blocks are introduced to reduce the effects of such noise images, a block containing thin lines or small letters might be judged as a non-blank block. Therefore, the conventional image processing device might not be able to correctly determine whether the obtained image is a blank image or a non-blank image.

The present invention provides a technique for reducing the possibility of erroneously determining that the obtained image is a blank image or a non-blank image.

In order to attain the above and other objects, the invention provides an image processing device. The image processing device includes an acquiring unit an image processing unit. The acquiring unit is configured to acquire image data indicating an image on an image depicting area. The image processing unit configured to perform an image depicting area division process, a first determination process, a second determination process, and a blank determination process. The image depicting area division process divides the image depicting area into a plurality of blocks having a same size. The first determination process determines whether each of the plurality of blocks is a single-color block, a non-single-color block, or a non-determinative block. Determination of the single-color block is made when a single block condition is met. Determination of the non-single-color block is made when a non-single-block condition is met. Determination of the non-determinative block is made when neither the single block condition nor the non-single-block condition is met. The second determination process determines whether the non-determinative block is the single block or the non-single block based on a result of the first determination process with respect to a neighboring block neighboring the non-determinative block. The blank determination process determines whether the image is a blank image based on at least one of number of single color blocks that are determined in the first determination process or the second determination process and number of non-single-color blocks that are determined in the first determination process or the second determination process.

According to another aspect, the present invention provides a method for processing image data. The method includes: acquiring the image data indicating an image on an image depicting area; dividing the image depicting area into a plurality of blocks having a same size; determining, using a microprocessor, as a first determination, whether each of the plurality of blocks is a single-color block, a non-single-color block, or a non-determinative block, determination of the single-color block being made when a single block condition is met, determination of the non-single-color block being made when a non-single-block condition is met, determination of the non-determinative block being made when neither the single block condition nor the non-single-block condition is met; determining, using the microprocessor, as a second determination, whether the non-determinative block is the single block or the non-single block based on a result of the first determination with respect to a neighboring block neighboring the non-determinative block; and determining, using the microprocessor, whether the image is a blank image based on at least one of number of single color blocks that are determined in the first determination or the second determination and number of non-single-color blocks that are determined in the first determination or the second determination.

According to still another aspect, the present invention provides a non-transitory computer readable storage medium storing a set of program instructions installed on and executed by a computer. The program instructions includes: acquiring the image data indicating an image on an image depicting area; dividing the image depicting area into a plurality of blocks having a same size; determining, as a first determination, whether each of the plurality of blocks is a single-color block, a non-single-color block, or a non-determinative block, determination of the single-color block being made when a single block condition is met, determination of the non-single-color block being made when a non-single-block condition is met, determination of the non-determinative block being made when neither the single block condition nor the non-single-block condition is met; determining, as a second determination, whether the non-determinative block is the single block or the non-single block based on a result of the first determination with respect to a neighboring block neighboring the non-determinative block; and determining whether the image is a blank image based on at least one of number of single color blocks that are determined in the first determination or the second determination and number of non-single-color blocks that are determined in the first determination or the second determination.

BRIEF DESCRIPTION OF THE DRAWINGS

The particular features and advantages of the invention as well as other objects will become apparent from the following description taken in connection with the accompanying drawings, in which:

FIG. 7 is an explanatory diagram illustrating a result of the first and second block determination processes performed on an image G1;

FIG. 8 is an explanatory diagram illustrating a result of the first and second block determination processes performed on an image G2; and FIG. 9 is histograms of blocks BX, BY, and BZ according to the embodiment.

DETAILED DESCRIPTION

A scanner 1 according to an embodiment of the invention will be described while referring to the accompanying drawings. The terms "upward", "downward", "upper", "lower", "above", "below", "beneath", "right", "left", "front", "rear" and the like will be used throughout the description assuming that the scanner is disposed in an orientation in which it is intended to be used. In use, the scanner 1 is disposed as shown in FIG. 1.

Exterior Configuration of Image Reading Device

Figure 1:
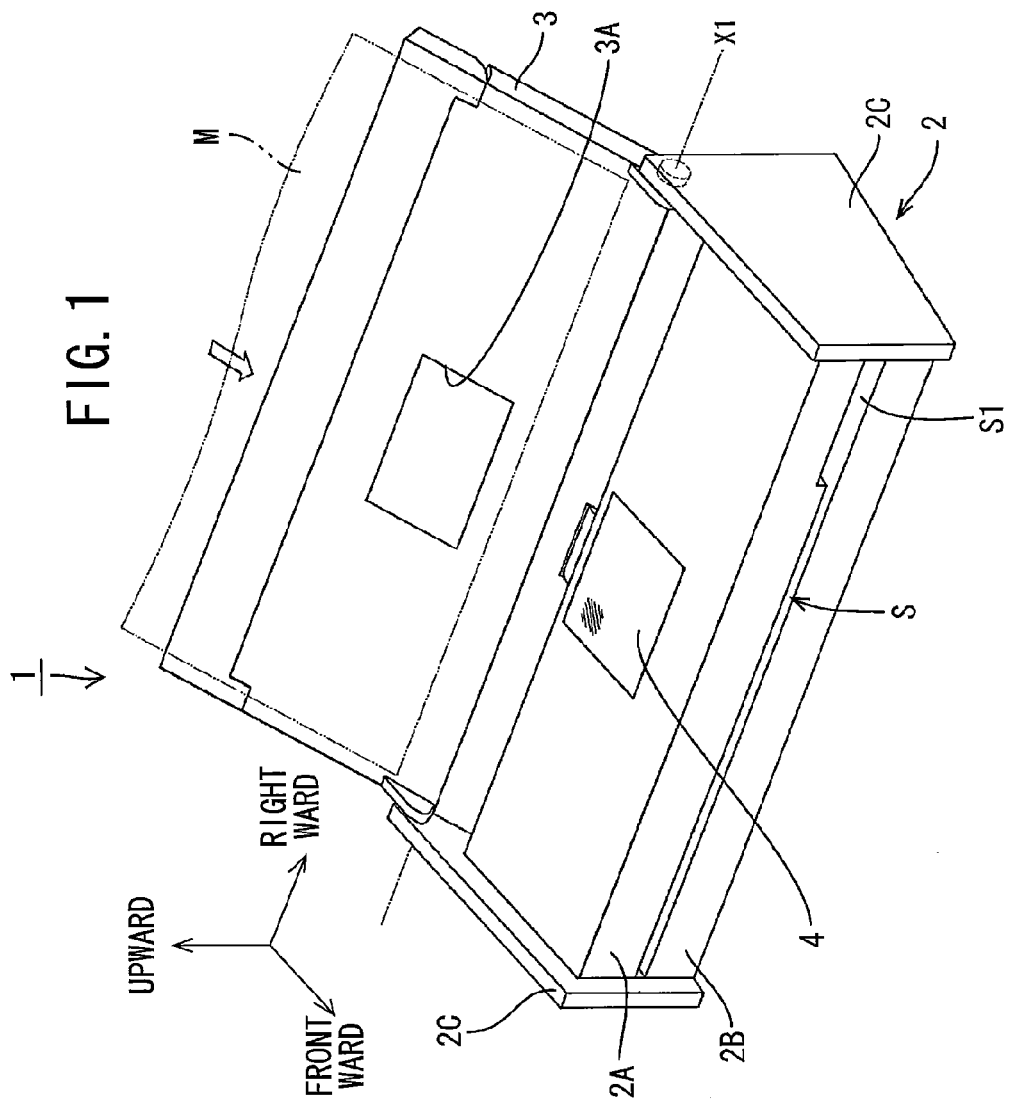
FIG. 1 is an external view of a scanner according to an embodiment of the invention.

As shown in FIG. 1, the scanner 1 includes a body casing 2 and a tray cover 3. The body casing 2 is formed into a rectangular parallelepiped having a longest side extending in a left-to-right direction. More specifically, the body casing 2 includes an upper-side frame 2A, a lower-side frame 2B, and a pair of side frames 2C. The upper-side frame 2A is disposed above the lower-side frame 2B, with a gap S therebetween. The pair of side frames 2C is disposed in such that the upper-side frame 2A and the lower-side frame 2B are sandwiched between the side frames 2C in the left-to-right direction.

The upper-side frame 2A includes a rectangular touch panel 4 as a display unit and an operation unit. The touch panel 4 can display various kinds of information, and accept a user's input operation in a touch-panel manner.

The tray cover 3 is provided in rear end portions of the pair of side frames 2C, 2C in such a way as to be able to rotate about a shaft X1 that extends in the left-to-right direction. Therefore, the tray cover 3 can shift into a covering posture and an uncovering posture (See FIG. 1): In the covering posture, the tray cover 3 covers an upper surface of the upper-side frame 2A. In the uncovering posture, the tray cover 3 exposes the upper surface of the upper-side frame 2A. The tray cover 3 in the uncovering posture functions as a document tray to hold document sheets M. The document sheets M are paper, OHP sheets, or any other sheets.

The tray cover 3 is formed with a rectangular window (opening) 3A, at a position corresponding to the touch panel 4. Even when the tray cover 3 is in the covering posture, the rectangular window 3A allows a user to view information displayed on the touch panel 4 through the window 3A, or to carry out input operation of the touch panel 4.

Figure 2:
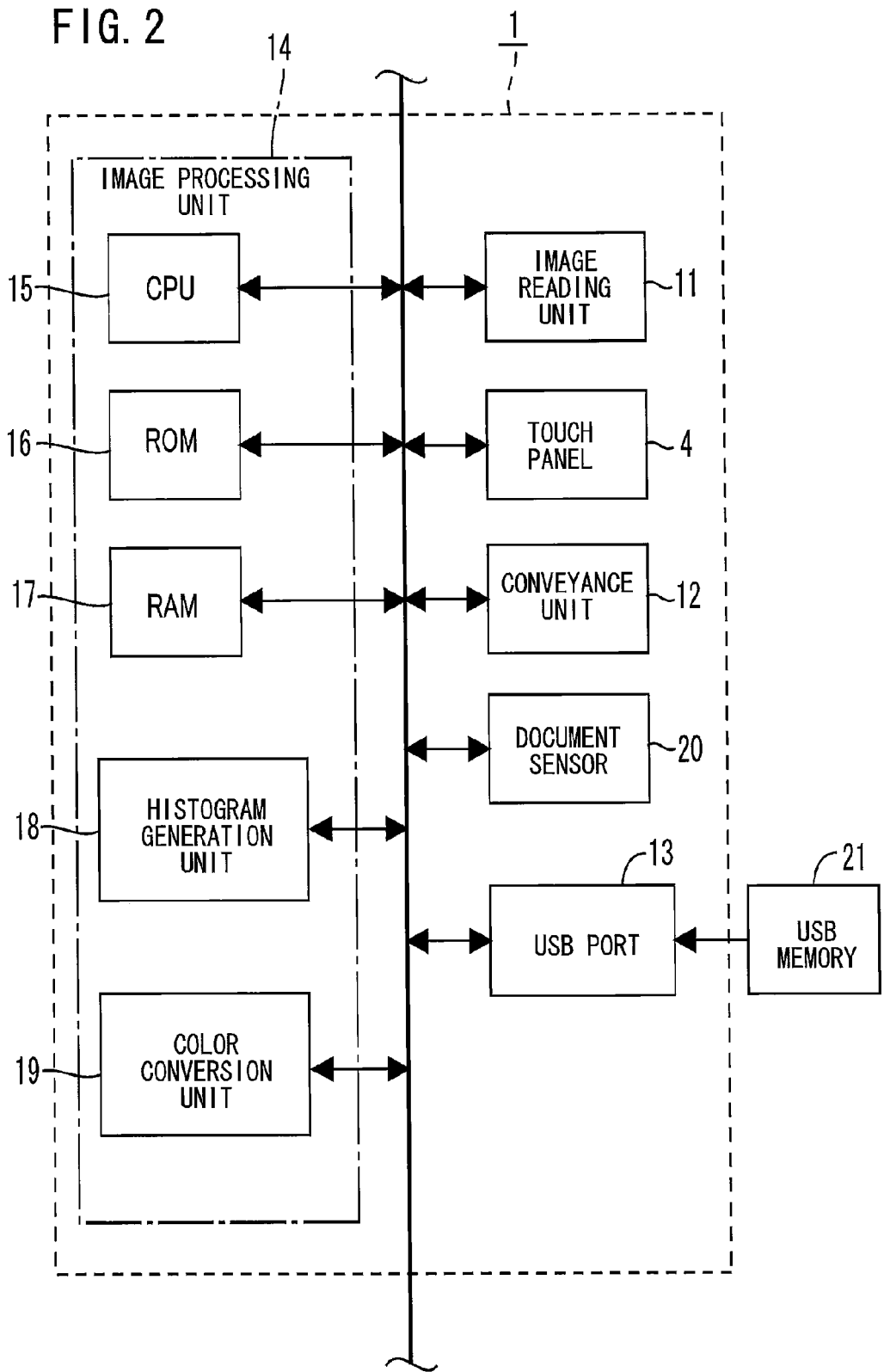
FIG. 2 is a block diagram illustrating an electrical configuration of the scanner shown in FIG. 1.

As shown in FIG. 2, the body casing 2 includes an image reading unit 11 and a conveyance unit 12 therein. The conveyance unit 12 conveys a document sheet M supported by the tray cover 3 forward (or in a direction indicated by a white arrow in FIG. 1) through the gap S, so that the document sheet M passes through the inside of the body casing 2 and subsequently is discharged from a front surface side of the body casing 2.

The image reading unit 11 is a reading device including a CIS (Contact Image Sensor). The image reading unit 11 reads an image on the document sheet M passing over a reading position (not shown) in the body casing 2, and outputs read data that has a row of pixels and corresponds to a read image G Here, the read data is data of RGB-color space. The image reading unit 11 may include a CCD (Charge Coupled Drive Image Sensor), for example, instead of the CIS.

A card insertion opening S1 is formed in the above gap S. A card can be inserted into the card insertion opening S1. The image reading unit 11 can read an image on a card inserted into the card insertion opening S1, and output the read data. For example, the card is a membership card or license made of plastic and so on.

Electric Configuration of Image Reading Device

As shown in FIG. 2, the scanner 1 includes the image reading unit 11, the touch panel 4, the conveyance unit 12, a USB (Universal Serial Bus) port 13, an image processing unit 14, and a document sensor 20 electrically connected therebetween.

A USB memory 21 can be connected to the USB port 13. The USB port 13 is used to obtain image data stored in the USB memory 21.

The image processing unit 14 includes a central processing unit (referred to as CPU, hereinafter) 15, a ROM 16, a RAM 17, a histogram generation unit 18, and a color conversion unit 19. In the ROM 16, a program for executing a reading control process (described later), and programs for various kinds of operation of the scanner 1 are stored. The CPU 15 controls each unit of the scanner 1 in accordance with programs read from the ROM 16. The media in which the various programs are stored may include not only the ROM 16 and the RAM 17, but also other non-volatile storage media such as CD-ROMs, hard disk devices, flash memories, and storage devices.

The read data that is output from the image reading unit 11 is AD-converted by an AD conversion unit (not shown), and is stored in the RAM 17. The histogram generation unit 18 is a hardware circuit dedicated to image processing. The histogram generation unit 18 performs a histogram generation process (described later) on the read data. The color conversion unit 19 is a hardware circuit dedicated to image processing. The color conversion unit 19 performs a color conversion process (described later) on the read data. The document sensor 20 detects whether or not a document sheet M exists on the tray cover 3, and transmits the detection result to the image processing unit 14.

Reading Control Process

After a user operates the touch panel 4 to give instructions for execution of image reading, for example, the image processing unit 14 performs a reading control process shown in FIGS. 3 to 6. The image processing unit 14 performs the reading control process to control the image reading unit 11 to read an image on a document sheet M or a card, and can determine whether or not the read image is a blank image. In the embodiment, the blank image indicate a solid-color, single-color image without characters, graphics, symbols, and patterns (referred to as characters and the like, hereinafter). The blank image is not limited to a white image, and may be a single-color image of any other color. The blank image is an image obtained by reading a plain sheet, for example. The non-blank image indicates an image other than the blank image.

First, the image processing unit 14 performs a reading process (S1). More specifically, the CPU 15 determines, based on the results of detection by the document sensor 20, whether or not a document sheet M exists on the tray cover 3. If the CPU 15 determines that there is a document sheet M, the CPU 15 starts running the conveyance unit 12 to convey the document sheet M on the tray cover 3. Then, the CPU 15 controls the image reading unit 11 to read an image on the document sheet M that is being conveyed. If the CPU 15 determines that there is no document sheet M, the CPU 15 does not start the conveyance unit 12, and controls the image reading unit 11 to read an image on a card inserted into the card insertion opening S1. The read data output from the image reading unit 11 is stored in the RAM 17.

After the start of the execution of the reading process, the image processing unit 14 starts a preliminary process before determining whether or not the read image G (G1, G2) is a blank image. The preliminary process includes an image division process (S2), a first block determination process (S3), and a second block determination process (S4). The image processing unit 14 may be so configured as to start the preliminary process after the entire image on the document sheet M or the card has been read, or to sequentially perform the preliminary process on each read portion in the middle of the process of reading the image on the document sheet M or the card.

(1) Image Division Process

The image processing unit 14 first performs the image division process as part of the preliminary process (S2). More specifically, as shown in the upper sections of FIGS. 7 and 8, the CPU 15 equally divides the read image G (G1, G2) (or depicting area of the image) based on the read data stored in the RAM 17 into a plurality of rectangular blocks B that are constant in size. The read image G1 (FIG. 7) is a non-blank image on which a triangular line-segment image is depicted. The read image G2 (FIG. 8) is a blank image that is dotted with noise images caused by dusts and so on. In the description below, each block B in the read images G1, G2 is identified by B(X, Y). Here, X indicates a horizontal order (position from the left top corner of the images G1 and G2), and Y indicate vertical order (position from the left top corner).

For example, in one block B, the number of pixels on vertical side (in one column) is 11, and the number of pixels on the horizontal side (in one row) is 18. The total number of pixels is 198. The image processing unit 14 may be so configured as to sequentially perform the image division process on a partial image consisting of a predetermined number of lines each time the predetermined number of lines have been read from the image on the document sheet M or the card. The predetermined number of lines is at least the number of lines that amount to the vertical size of one block B.

(2) First Block Determination Process

Figure 4:
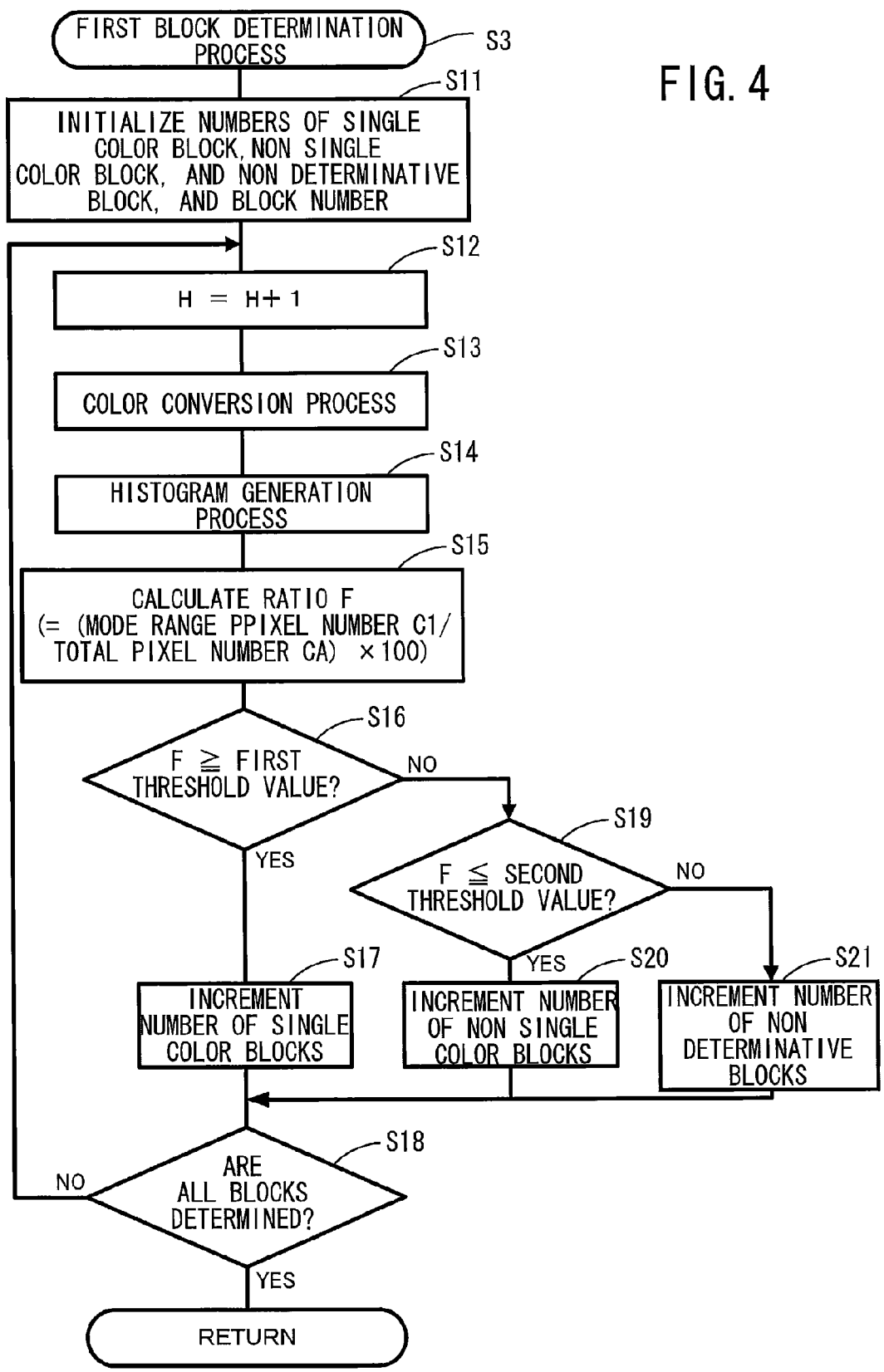
FIG. 4 is a flowchart illustrating a first determination process according to the embodiment.

After executing the image division process, the image processing unit 14 performs the first block determination process (S3) shown in FIG. 4. The first block determination process makes a first block determination that determines whether each of the blocks B obtained by the image division process is a single-color block or a non-single-color block or a non-determinative block.

"Single-color block" is a block in which variation of pixel values (density) of a pixels in the block is small, and almost all of the pixels in the block have a pixel value (density) of a specific color (referred to as specific-color pixels, hereinafter). For example, a block including only a ground color (background color) portion of the read image G is a single-color block.

"Non-single-color block" is a block in which variation of pixel values of pixels in the block is large, and the number of non-specific-color pixels in the block is greater than or equal to a predetermined value. Here, the non-specific-color pixels are pixels other than the specific-color pixels. For example, a block including a predetermined size or greater of a characters-and-the-like portion of the read image G is a non-single-color block.

"Non-determinative block" is a block in which variation of pixel values of pixels in the block is larger than that of the single-color block and less than that of the non-single-color block, and the specific-color pixels and a few non-specific-color pixels exist in the block. A block including a part of characters-and-the-like of the read image G should be recognized as a non-single-color block, and a block including no characters-and-the-like image but including a noise image should be recognized as a single-color block. However, the information about the pixels included in one block is not enough to distinguish between the two blocks. Therefore, in the first block determination process, the image processing unit 14 does not determines these two blocks as the single-color block or the non-single-color block, and determines the blocks as the non-determinative blocks.

First, in S11 the CPU 15 initializes the number of single-color blocks, the number of non-single-color blocks, the number of non-determinative blocks, and a block number H such that those numbers become zero. Then, in S12, the CPU 15 adds 1 to the block number H. Then, in S13 the CPU 15 selects the H-th block B and instructs the color conversion unit 19 to perform a color conversion process on the H-th block B. Here, the CPU 15 may select arbitrary the H-th block on which the color conversion process has not been processed. For example, the CPU selects the block in the order horizontally shifting the position of the block to the right end of the horizontal line, and sequentially selects the block located at left end of the next horizontal line. The color conversion unit 19 performs a YCbCr conversion process to convert the read data of pixels in the H-th block from data of RGB-color space into data of YCbCr-color space having luminance data Y and two sets of color difference data Cb and Cr.

Then, in S14 the CPU 15 instructs the histogram generation unit 18 to perform a histogram generation process on the H-th block B. More specifically, the histogram generation unit 18 generates, from the luminance data Y, a histogram (frequency distribution) of the pixels in the H-th block B. In FIG. 9, histograms of three different blocks BX to BZ are illustrated. In each histogram, the vertical axis represents the number of pixels, and the horizontal axis represents the value of the luminance data Y (luminance value Y).

In the block BX shown in the top of FIG. 9, variation of the histogram is small. The number of pixels indicating a mode value Y1 of luminance values Y in the block BX is substantially equal to the total number of pixels of the block BX. Accordingly, the block BX can be judged as an obvious single-color block. Hereinafter, the number of pixels having the mode value Y is referred to as number of mode pixels.

In the block BZ shown in the bottom of FIG. 9, variation of the histogram is large. The number of mode pixels thereof is less than that of the block BX, and there are many pixels indicating pixel values other than the mode value Y1. Accordingly, the block BZ can be judged as an obvious non-single-color block.

In the block BY between the blocks BX and BZ, variation of the histogram is larger than that of the block BX and smaller than that of the block BZ. The number of mode pixels thereof is less than that of the block BX and greater than that of the block BZ, and there are just a few pixels that indicate pixel values other than the mode value Y1. Accordingly, the variation of the histogram of the block BY is not enough to clearly determine whether the block BY is a single-color block or a non-single-color block.

Therefore, in S15 the image processing unit 14 performs a variation value calculation process on the H-th block B to calculate a variation value that represents the variation of the histogram of the pixels in the H-th block B. More specifically, the CPU 15 calculates, from the histogram, a mode pixel ratio F. The mode ratio F is the ratio of a mode range pixel number C1 to a total pixel number CA of one block B (=(C1/CA)× 100). As shown in FIG. 9, the mode range pixel number C1 is the number of pixels within a predetermined width 2D whose center is the above mode value Y1.

In that manner, by making use of the mode value Y1, the image processing unit 14 can calculate the variation value of the histogram without performing a complex calculation process such as calculation for standard deviation. Moreover, when calculating the mode pixel ratio F, the image processing unit 14 takes into account the predetermined width 2D. Therefore, compared with a configuration that does not take into account the predetermined width 2D, the image processing unit 14 can prevent a block B of a ground-color portion to be mistakenly judged as a non-single-color block due to variation in the ground color of the read image G.

After calculating the variation value of the H-th block B, in S16, the image processing unit 14 determines whether or not the variation value satisfies single-color conditions. If the image processing unit 14 determines that the variation value satisfies the single-color conditions (S16: YES), then the image processing unit 14 judges the H-th block B as a single-color block. More specifically, in S16, the CPU 15 determines whether or not the mode pixel ratio F is greater than or equal to a first threshold value (e.g. 99.8%). If the CPU 15 determines that the mode pixel ratio F is greater than or equal to the first threshold value (S16: YES), then in S17 the CPU 15 adds only 1 to the number of single-color blocks, and proceeds to S18. In S17, the CPU 15 stores data indicating that the H-th block is the single-color block in the RAM 17.

If the image processing unit 14 determines that the mode pixel ratio F is not greater than or equal to the first threshold value (S16: NO), then in S19 the image processing unit 14 determines whether or not the variation value satisfies non-single-color conditions. If the image processing unit 14 determines that the variation value satisfies the non-single-color conditions (S19: YES), then the image processing unit 14 judges the H-th block B as a non-single-color block. More specifically, in S19 the CPU 15 determines whether or not the mode pixel ratio F is less than or equal to a second threshold value (e.g. 95.0%). If the CPU 15 determines that the mode pixel ratio F is less than or equal to the second threshold value (S19: YES), then in S20 the CPU 15 adds only 1 to the number of non-single-color blocks, and proceeds to S18. In S20, the CPU 15 stores data indicating that the H-th block is the non-single-color block in the RAM 17.

If the image processing unit 14 determines that the variation value does not satisfy both the single-color and non-single-color conditions (S16: NO, and S19: NO), then the image processing unit 14 determines that the H-th block B is a non-determinative block. More specifically, if the CPU 15 determines that the mode pixel ratio F is less than the first threshold value and greater than the second threshold value (S16: NO, and S19: NO), then in S21 the CPU 15 adds only 1 to the number of non-determinative blocks, and proceeds to S18. In S21, the CPU 15 stores data indicating that the H-th block is the non-determinative block in the RAM 17.

In S18, the image processing unit 14 determines whether or not the first block determination (S13 to S21) has been made on all the blocks B on the read image G More specifically, in S18, the CPU 15 determines whether or not the current block number H has reached a final block number (the number of all the blocks on the read image G). If the CPU 15 determines that the current block number H has not reached the final block number HA (S18: NO), then the CPU 15 returns to S12, and makes the first block determination on the next block B. If the CPU 15 determines that the current block number H has reached the final block number HA (S18: YES), then the CPU 15 ends this first block determination process.

As a result of the first block determination, as shown in the middle section of FIG. 7, in the read image G1, blocks B (3, 1), B (4, 1), B (4, 5), B (5, 5), B (5, 9) that include very small amounts of the line segment of the triangle are judged as non-determinative blocks (blocks shaded with diagonal lines in the diagram). Moreover, as shown in the middle section of FIG. 8, in the read image G2, blocks B (1, 4), B (2, 8), B (4, 2), B (5, 5), B (5, 9) that include very small amounts of noise images are judged as non-determinative blocks (blocks shaded with diagonal lines in the diagram).

(3) Second Block Determination Process

Figure 3:
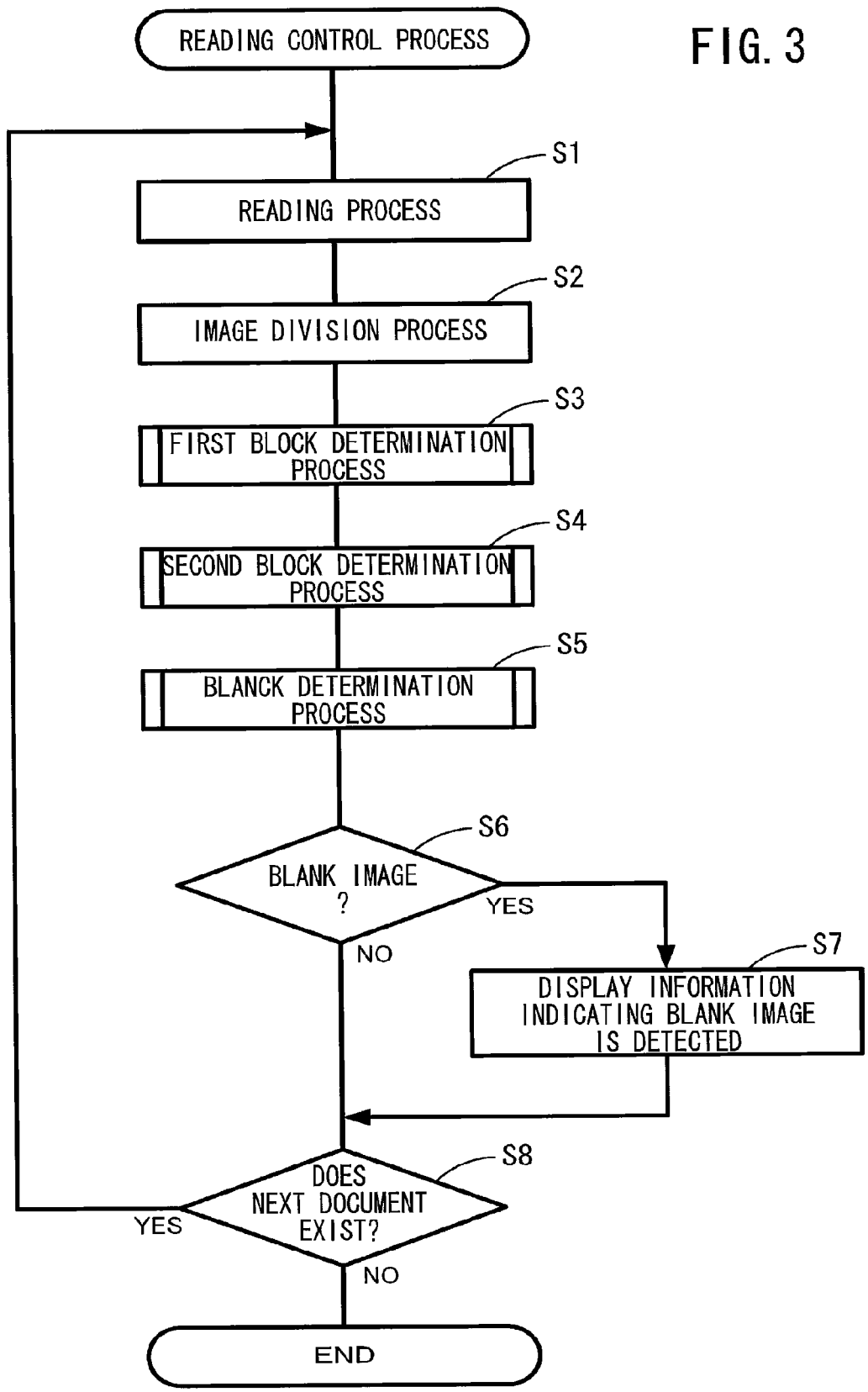
FIG. 3 is a flowchart illustrating a reading control process according to the embodiment.
Figure 5:
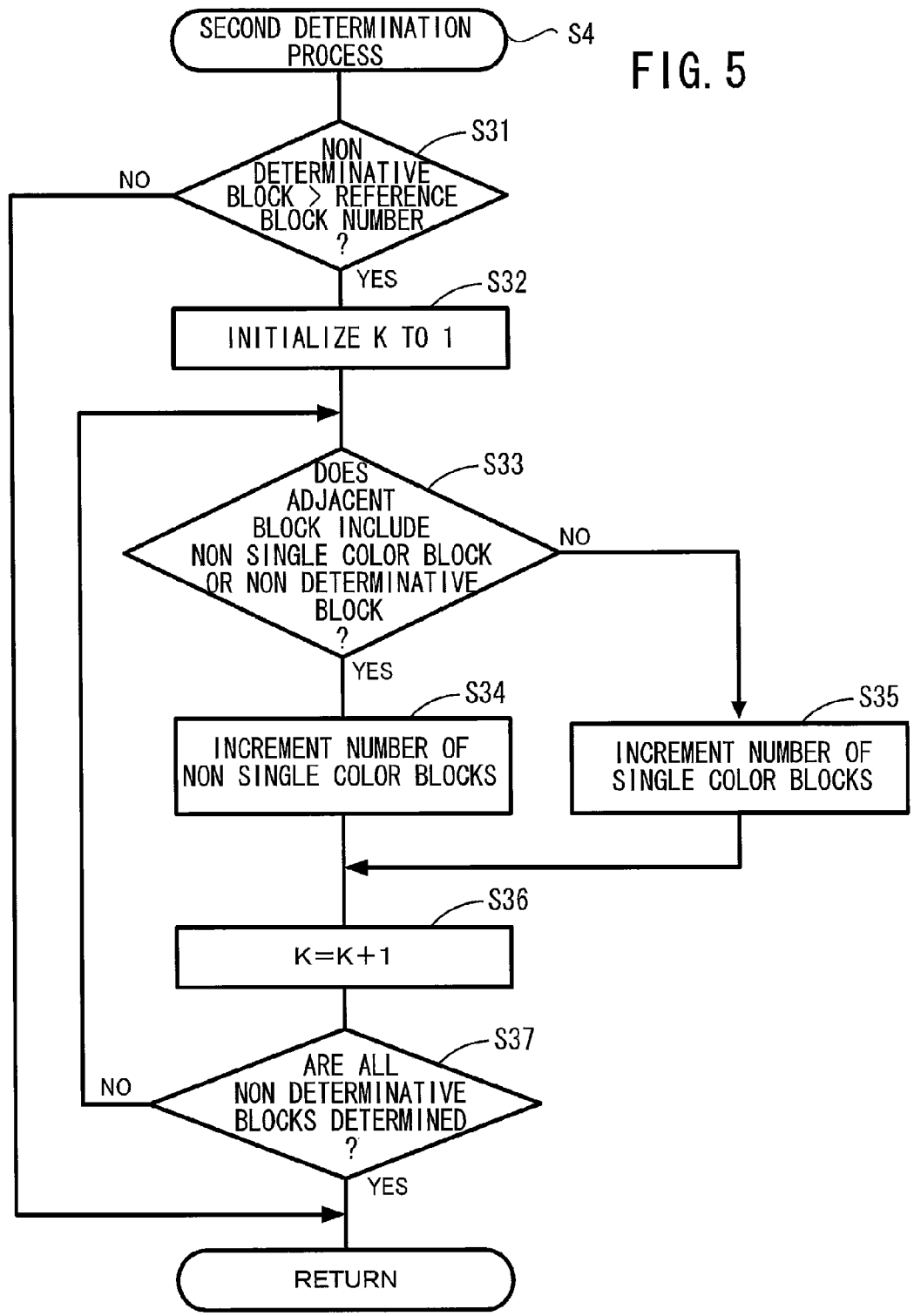
FIG. 5 is a flowchart illustrating a second determination process according to the embodiment.

As shown in FIG. 3, after ending the first block determination process (S3), the image processing unit 14 performs the second block determination process (S4) shown in FIG. 5. The second block determination process is a process of making a second block determination that determines, based on the results of the first block determination on neighboring blocks positioned neighboring a non-determinative block judged by the first block determination (hereinafter, which may simply be referred to as a non-determinative block), whether the non-determinative block is a single-color block or a non-single-color block. According to the present embodiment, the neighboring blocks are only adjacent blocks that are adjacent to and contact to the non-determinative block. That is, in the embodiment, the adjacent blocks contact the corresponding non-determinative block.

First, in S31 the CPU 15 determines whether or not the number of non-determinative blocks of S21 shown in FIG. 4 is greater than a reference block number (e.g. zero). If the CPU 15 determines that the number of non-determinative blocks is less than or equal to the reference block number (S31: NO), then the CPU 15 ends this second block determination process. If the CPU 15 determines that the number of non-determinative blocks is greater than the reference block number (S31: YES), in S32 the CPU 15 initializes a non-determinative block number K so that the non-determinative block number K becomes 1.

Then, in S33 the CPU 15 selects a K-th non-determinative block among the non-determinative blocks on which the second determination process (S33-35) has not performed. In S33, the image processing unit 14 determines whether or not the number of blocks that are among the adjacent blocks of a K-th non-determinative block and have been judged as either non-single-color or non-determinative blocks by the first block determination is greater than or equal to a prescribed number (e.g. one). If the adjacent blocks include a block that has been judged as either a non-single-color or non-determinative block, the K-th non-determinative block is likely to be a block including a characters-and-the-like portion of the read image G. If the adjacent blocks do not include a block that has been judged as either a non-single-color or non-determinative block, the K-th non-determinative block is likely to be a block including a noise image of the read image G but not including the characters-and-the-like portion.

Therefore, if the CPU 15 determines that the number of blocks that are among the adjacent blocks and have been judged as either non-single-color or non-determinative blocks by the first block determination is greater than or equal to the prescribed number (S33: YES), then in S34 the CPU 15 judges the K-th non-determinative block a non-single-color block, and adds only 1 to the number of non-single-color blocks counted in the above first block determination (S20), and then proceeds to S36. In S34, the CPU 15 stores data that the K-th non-determinative block is the non-single-color block in the RAM 17. If the CPU 15 determines that the number of blocks that are among the adjacent blocks and have been judged as either non-single-color or non-determinative blocks by the first block determination is less than the prescribed number (S33: NO), then in S35 the CPU 15 judges the K-th non-determinative block a single-color block, and adds only 1 to the number of single-color blocks counted in the above first block determination (S17), and then proceeds to S36. In S35, the CPU 15 stores data that the K-th non-determinative block is the ingle-color block in the RAM 17.

In S36, the image processing unit 14 adds only 1 to the non-determinative block number K, and in S37 determines whether or not the second block determination (S33 to S35) have been made on all non-determinative blocks of the read image G. More specifically, in S37 the CPU 15 determines whether or not the current non-determinative block number K has reached a total number KA of non-determinative blocks counted in the first block determination (S21). If the CPU 15 determines that the current non-determinative block number K has not reached the total number KA (S37: NO), then the CPU 15 returns to S33, and makes a second block determination on the next non-determinative block. If the CPU 15 determines that the current non-determinative block number K has reached the total number KA (S37: YES), the CPU 15 ends this second block determination process.

As a result of the second block determination, as shown in the middle section of FIG. 7, on the read image G1, because each of non-determinative blocks B (3, 1), B (4, 1), B (4, 5), B (5, 5), and B (5, 9) has an adjacent block that has been judged as either non-single-color or non-determinative blocks by the first block determination, all the non-determinative blocks are judged as non-single-color blocks (see the lower section of the diagram). Moreover, as shown in the middle section of FIG. 8, on the read image G2, because blocks that have been judged as either non-single-color or non-single-color blocks by the first block determination do not exist among the adjacent blocks of the non-determinative blocks B (1, 4), B (2, 8), B (4, 2), B (5, 5), and B (5, 9), the non-determinative blocks are judged as single-color blocks (see the lower section of the diagram).

(4) Blank Determination Process

Figure 6:
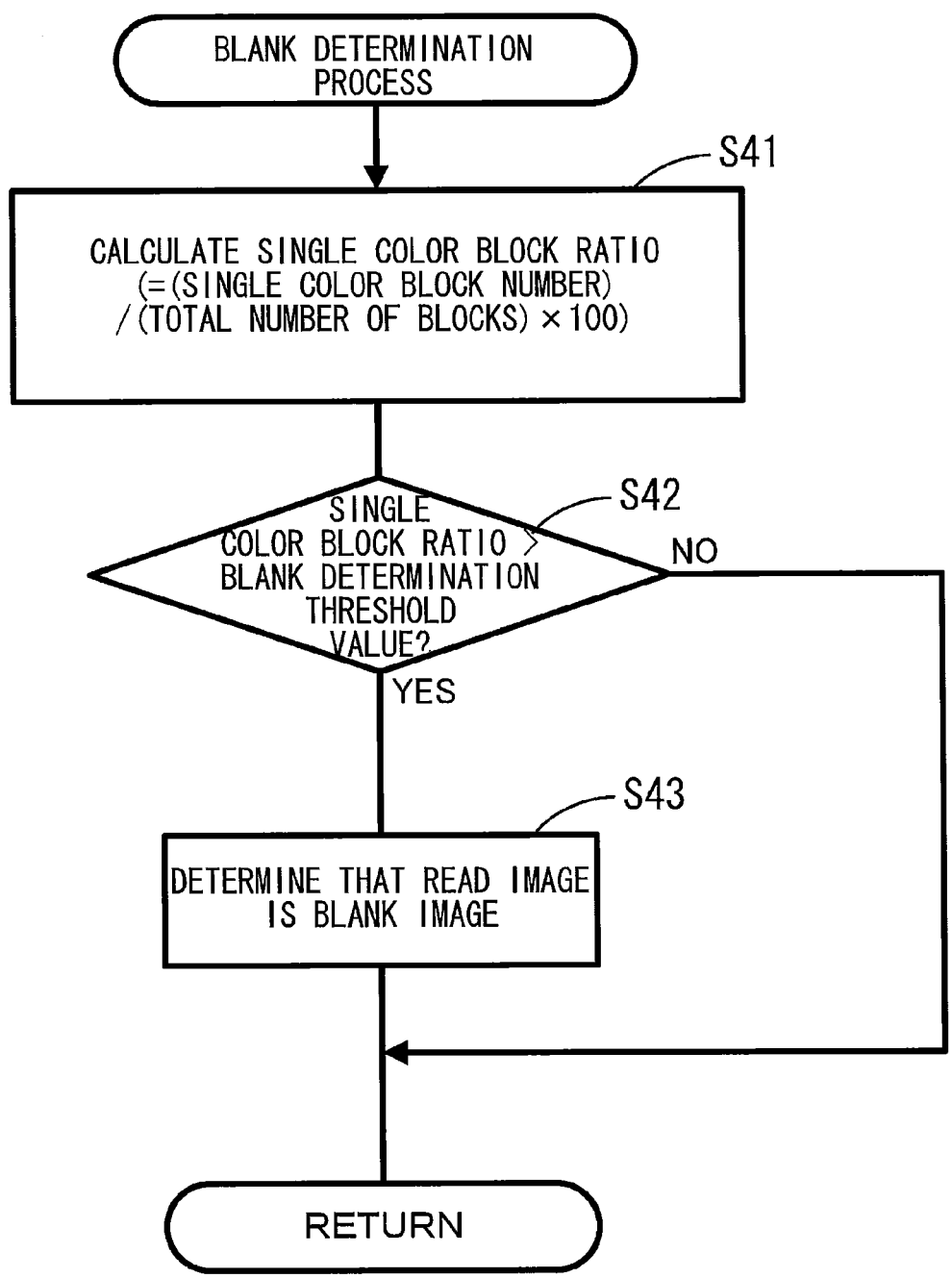
FIG. 6 is a flowchart illustrating a blanc determination process according to the embodiment.

As shown in FIG. 3, after ending the second block determination process (S4), in S5, the image processing unit 14 performs a blank determination process shown in FIG. 6. The blank determination process determines whether or not the read image G is a blank image based on at least either the number of blocks that have been judged as single-color blocks by the first block determination and the second block determination (hereinafter, referred to as a single-color block number), or the number of blocks that have been judged as non-single-color blocks (hereinafter, referred to as a non-single-color block number).

First, in S41 the CPU 15 calculates a single-color block ratio. The single-color block ratio is the ratio of the single-color block number to the total number of blocks on the read image G. That is, (single-color block ratio)=(single color block number)/(total number of blocks)×100. In S42, the CPU 15 determines whether or not the single-color block ratio is greater than or equal to a blank determination threshold value (e.g. 99.7%). If the CPU 15 has made an affirmative determination (S42: YES), then in S43 the CPU 15 judges the read image G, or the image on the document sheet M or the card, as a blank image. The CPU 15 therefore sets a blank flag in the RAM 17, for example, and ends this blank determination process. If the CPU 15 has made a negative determination (S42: NO), then the CPU 15 determines that the read image G is not a blank image. The CPU 15 therefore ends this blank determination process, without setting the blank flag, for example.

After ending the blank determination process, in S6 the image processing unit 14 determines whether or not the blank flag is set in the RAM 17. If the image processing unit 14 determines that the blank flag is set in the RAM 17 (S6: YES), then in S7 the image processing unit 14 controls the touch panel 4 to display the information indicating that the blank image has been detected, and proceeds to S8. If the image processing unit 14 determines that the blank flag is not set in the RAM 17 (S6: NO), then the image processing unit 14 does not display on the touch panel 4 the information indicating that the blank image has been detected, and proceeds to S8.

Based on the results of detection by the document sensor 20, in S8 the image processing unit 14 determines whether or not the next document sheet M is on the tray cover 3. If the image processing unit 14 determines that the next document sheet exists (S8: YES), the image processing unit 14 returns to S1, and starts the reading process on the next document sheet M. If the image processing unit 14 determines that the next document sheet does not exist (S8: NO), the image processing unit 14 ends this reading control process. In the case of card reading, the image processing unit 14 ends this reading control process without performing the process of S8.

Advantageous Effects of the Present Embodiment

The scanner 1 determines whether each of blocks B obtained by dividing an acquired image is a single-color block, a non-single-color block or a non-determinative block as the first block determination. Then, based on the results of the first block determination on neighboring blocks close to a block that has been judged as a non-determinative block, the scanner 1 makes the second block determination that determines whether the block that has been judged as a non-determinative block is a single-color block or a non-single-color block.

Then, based on at least either the number of blocks that have been judged as single-color blocks by the first block determination and the second block determination, or the number of blocks that have been judged as non-single-color blocks, the scanner 1 determines whether or not the acquired image is a blank image. Therefore, compared with a configuration that simply determines whether or not the acquired image is a blank image based only on the results of a one-off block determination process of determining whether each block is a single-color block or a non-single-color block, the scanner 1 can reduce the possibility of erroneously determining whether the acquired image is a blank image or a non-blank image.

Moreover, in the embodiment, if the number of blocks that are among the adjacent blocks and have been judged as either non-single-color or non-determinative blocks by the first block determination is less than the prescribed number (S33: NO), then in S35 the CPU 15 judges the K-th non-determinative block a single-color block. Compared with a configuration that determines, if the number of only blocks that have been judged as non-single-color blocks by the first block determination among the neighboring blocks is less than the specified value, that a block that has been judged as a non-determinative block by the first block determination is a single-color block, the scanner 1 can reduce the possibility of determining that a block containing thin lines or small letters is a non-blank block.

Moreover, compared with a configuration in which the neighboring blocks include unadjacent blocks that do not contact a block that has been judged as a non-determinative block by the first block determination, the scanner 1 can make the second block determination more easily.

Modification

While the invention has been described in detail with reference to the embodiment thereof, it would be apparent to those skilled in the art that various changes and modifications may be made therein without departing from the scope of the invention.

In the above embodiment, the scanner 1 having only one image reading function is explained as one of the example of an image processing device. However, the image processing device may be a device having a plurality of image reading functions, such as, a multifunction peripheral. Further, the image processing device may not have an image reading function, as long as the image processing device has a configuration to acquire image data (image) from an external device or an internal memory, for example. More specifically, the image processing device may be a data processing device such as a computer, an image forming device such as a printer, and a mobile terminal such as a smartphone and a tablet computer. Here, the external device is a scanner, a memory, a server, or a filming equipment such as a digital camera.

Image data (read data) may not be acquired through the image reading unit 11 or the USB port 13, but may be acquired from an communication unit, or an interface provided in the image processing device. Here, the communication unit acquires the image data from an external device via wire of wireless communication. The interface acquires the image data from an internal memory in the image processing device.

In the embodiment, the CPU 15, with the histogram generation unit 18, and a color conversion unit 19 executes the reading control process. However, one or more CPUs without hardware such as the histogram generation unit 18, and a color conversion unit 19 may execute the reading control process. Alternatively, only hardware such as ASIC (Application Specific Integrated Circuit) executes the reading control process. In other words, part of the configuration of the invention implemented in hardware in the embodiment described above may be replaced by software and, conversely, part of the configuration of the invention implemented in software may be replaced by hardware.

The first block determination process (S3) may not perform the color conversion process (S13) and the histogram process (S14). In this case, the image processing unit 14 may be configured to calculate the number of mode pixels for pixel values of each of RGB colors. If the number of mode pixels of two or more colors is greater than or equal to a non-single-color threshold value, the image processing unit 14 judges the block B as a non-single-color block. If the number for only one color is greater than or equal to a single-color threshold value, the image processing unit 14 judges the block B as a single-color block. If any of the above conditions is not satisfied, the image processing unit 14 judges the block B as a non-determinative block. However, according to the configuration of the above embodiment, the first block determination can be easily made with only luminance components, and the use of histograms makes the first block determination more accurate.

The color conversion process (S13) is not limited to a YCbCr conversion process, as long as in the color conversion process (S13), data of pixels included in each block B may be converted into data of a color space having luminance components. For example, the color conversion process (S13) may be a Lab conversion process in which the read data is converted into data of a Lab-color space including luminosity data L.

In the first block determination process, the image processing unit 14 may calculate a standard deviation or variance for luminance values Y of the pixels in the H-th block B, and make the first block determination by using the value of the standard deviation or the variance. In this case, the image processing unit 14 may be configured to calculate the standard deviation or the variance instead of the mode pixel ratio F in S15 of FIG. 4 without carrying out the histogram generation process (S14).

In the variation value calculation process (S15), the mode value Y1 may not be a center value of a predetermined width (2D). For example, the mode range pixel number may be the number of pixels within a predetermined width 2D within which the mode value Y1 exists. Moreover, the mode pixel ratio F may not take into account the predetermined width 2D, and be the number of only pixels indicating the mode value Y1 with respect to the total pixel number CA. However, in the case of a configuration that takes into account the reference width as in the above embodiment, the effects of variation of the ground color of the read image G can be reduced.

The single-color condition and the non-single-color condition are conditions for the mode pixel ratio F. However, the present invention is not limited to this. If the total pixel number CA of the block B is a fixed value, the single-color condition and the non-single-color condition may be for the number of mode pixels. For example, the single-color condition may be such that the number of mode pixels is greater than or equal to a predetermined threshold value.

In S33 of the second block determination process, the neighboring blocks may include not only adjacent blocks but also unadjacent blocks that do not contact to the subject non-determinative block. For example, if the image processing unit 14 makes an affirmative determination in S33 for the K-th non-determinative block (S33: YES), the image processing unit 14 may judge the K-th non-determinative block as a non-single-color block if the image processing unit 14 determines that blocks (successive blocks) that are adjacent outside the adjacent blocks include a block that has been judged as either a non-single-color block or a non-determinative block by the first block determination.

The image processing unit 14 may judge the K-th non-determinative block as a non-single-color block if the image processing unit 14 determines that the number of non-single-color blocks judged in the first block determination among the adjacent blocks of K-th non-determinative block is greater than or equal to a prescribed number (which may be two or more). Alternatively, the image processing unit 14 may judge the K-th non-determinative block as a non-single-color block if the image processing unit 14 determines that the number of non-determinative blocks judged in the first block determination among the adjacent blocks of the K-th non-determinative block is greater than or equal to a prescribed number (which may be two or more).

The image processing unit 14 may calculate a non-single-color block ratio in S41 of the blank determination process. The non-single-color block ratio is the ratio of non-single-color blocks to the total number of blocks of the read image G. The CPU 15 determines whether or not the non-single-color block ratio is less than or equal to a blank determination threshold value (e.g. 0.3) (S42). If the CPU 15 has made an affirmative determination (S42:YES), the CPU 15 may determine that the read image G is a blank image (S43).

What is claimed is:

1. An image processing device comprising:
    an acquiring unit configured to acquire image data indicating an image on an image depicting area; and
    an image processing unit configured to perform:
        an image depicting area division process that divides the image depicting area into a plurality of blocks having a same size;
        a first determination process that determines whether each of the plurality of blocks is a single-color block, a non-single-color block, or a non-determinative block, determination of the single-color block being made when a single-color condition is met, determination of the non-single-color block being made when a non-single-color condition is met, and determination of the non-determinative block being made when neither the single-color condition nor the non-single-color condition is met;
        a second determination process that determines whether the non-determinative block is the single-color block or the non-single-color block based on a result of the first determination process with respect to a neighboring block neighboring the non-determinative block; and
        a blank determination process that determines whether the image is a blank image based on at least one of number of single color blocks that are determined in the first determination process or the second determination process and number of non-single-color blocks that are determined in the first determination process or the second determination process,
    wherein in the second determination process, the image processing unit is configured to:
        set a target non-determinative block from among the non-determinative blocks determined in the first determination process;
        obtain a first number of blocks determined as the non-single-color block or the non-determinative block in the first determination process from among the neighboring blocks of the target non-determinative block; and
        determine whether the first number of blocks with respect to the target non-determinative block is less than a prescribed value, wherein, when the first number of blocks is less than the prescribed value, the target non-determinative block is determined as the single-color block whereas, when the first number of blocks is greater than or equal to the prescribed value, the target non-determinative block is determined as the non-single-color block.

2. The image processing device according to claim 1, wherein the neighboring block contacts the non-determinative block.

3. The image processing device according to claim 1, wherein each of the plurality of blocks includes a plurality of sets of pixel data,
    wherein the image processing unit is configured to perform a conversion process that converts each of the plurality of sets of pixel data into data having a luminance component, and
    wherein the single-color condition and the non-single-color condition concern the luminance component.

4. The image processing device according to claim 3, wherein the image processing unit is configured to perform:
    a histogram generating process that generates a histogram of luminance component values of the plurality of sets of pixel data for each of the plurality of blocks; and
    a variation calculation process that calculates a variation value concerning a variation of the luminance component values in the histogram,
    wherein the single-color condition indicates that the variation value is greater than or equal to a first threshold value, and
    wherein the non-single-color condition indicates that the variation value is less than or equal to a second threshold value less than the first threshold value.

5. The image processing device according to claim 4, wherein, in the variation calculation process, the image processing unit calculates the variation value by comparing a number of first sets of pixel data with a number of all sets of pixel data in the block, the first sets of pixel data including second sets of pixel data whose luminance value is a mode value in the histogram.

6. The image processing device according to claim 5, wherein the first sets of pixel data further includes third sets of pixel data whose luminance component is within a prescribed range from the mode value.

7. The image processing device according to claim 1, wherein the acquiring unit includes a scanner that reads the image by scanning a sheet.

8. A method for processing image data, comprising:
    acquiring the image data indicating an image on an image depicting area;
    dividing the image depicting area into a plurality of blocks having a same size;
    determining, using a microprocessor, as a first determination, whether each of the plurality of blocks is a single-color block, a non-single-color block, or a non-determinative block, determination of the single-color block being made when a single-color condition is met, determination of the non-single-color block being made when a non-single-color condition is met, and determination of the non-determinative block being made when neither the single-color condition nor the non-single-color condition is met;
    determining, using the microprocessor, as a second determination, whether the non-determinative block is the single-color block or the non-single-color block based on a result of the first determination with respect to a neighboring block neighboring the non-determinative block; and
    determining, using the microprocessor, whether the image is a blank image based on at least one of number of single-color blocks that are determined in the first determination or the second determination and number of non-single-color blocks that are determined in the first determination or the second determination, wherein the second determination includes:
  setting a target non-determinative block from among the non-determinative blocks determined in the first determination;
  obtaining a first number of blocks determined as the non-single-color block or the non-determinative block in the first determination from among the neighboring blocks of the target non-determinative block; and
  determining whether the first number of blocks with respect to the target non-determinative block is less than a prescribed value, wherein, when the first number of blocks is less than the prescribed value, the target non-determinative block is determined as the single-color block whereas, when the first number of blocks is greater than or equal to the prescribed value, the target non-determinative block is determined as the non-single-color block.

9. A non-transitory computer readable storage medium storing instructions executable by a computer, the instructions comprising:
  acquiring image data indicating an image on an image depicting area;
  dividing the image depicting area into a plurality of blocks having a same size;
  determining, as a first determination, whether each of the plurality of blocks is a single-color block, a non-single-color block, or a non-determinative block, determination of the single-color block being made when a single-color condition is met, determination of the non-single-color block being made when a non-single-color condition is met, and determination of the non-determinative block being made when neither the single-color condition nor the non-single-color condition is met;
  determining, as a second determination, whether the non-determinative block is the single-color block or the non-single-color block based on a result of the first determination with respect to a neighboring block neighboring the non-determinative block; and
  determining whether the image is a blank image based on at least one of number of single-color blocks that are determined in the first determination or the second determination and number of non-single-color blocks that are determined in the first determination or the second determination,
wherein the second determination includes:
  setting a target non-determinative block from among the non-determinative blocks determined in the first determination;
  obtaining a first number of blocks determined as the non-single-color block or the non-determinative block in the first determination from among the neighboring blocks of the target non-determinative block; and
  determining whether the first number of blocks with respect to the target non-determinative block is less than a prescribed value, wherein, when the first number of blocks is less than the prescribed value, the target non-determinative block is determined as the single-color block whereas, when the first number of blocks is greater than or equal to the prescribed value, the target non-determinative block is determined as the non-single-color block.

* * * * *